US012319979B2

(12) United States Patent
Okajima et al.

(10) Patent No.: US 12,319,979 B2
(45) Date of Patent: Jun. 3, 2025

(54) METHOD FOR RECOVERING VALUABLE METAL

(71) Applicant: JX NIPPON MINING & METALS CORPORATION, Tokyo (JP)

(72) Inventors: Nobuaki Okajima, Hitachi (JP); Kazunori Tajiri, Hitachi (JP); Hiromichi Kashimura, Hitachi (JP)

(73) Assignee: JX METALS CIRCULAR SOLUTIONS CO., LTD., Tokyo (JP)

( * ) Notice: Subject to any disclaimer, the term of this patent is extended or adjusted under 35 U.S.C. 154(b) by 1014 days.

(21) Appl. No.: 17/418,674

(22) PCT Filed: Dec. 23, 2019

(86) PCT No.: PCT/JP2019/050411
§ 371 (c)(1),
(2) Date: Jun. 25, 2021

(87) PCT Pub. No.: WO2020/137997
PCT Pub. Date: Jul. 2, 2020

(65) Prior Publication Data
US 2022/0127697 A1    Apr. 28, 2022

(30) Foreign Application Priority Data

Dec. 27, 2018  (JP) ................. 2018-246257

(51) Int. Cl.
*C22B 3/00* (2006.01)
*C22B 7/00* (2006.01)
(Continued)

(52) U.S. Cl.
CPC .......... *C22B 23/0461* (2013.01); *C22B 7/007* (2013.01); *C22B 23/0484* (2013.01);
(Continued)

(58) Field of Classification Search
CPC .. C22B 23/0461; C22B 23/0484; C22B 7/007
See application file for complete search history.

(56) References Cited

U.S. PATENT DOCUMENTS 5,447,552 A * 9/1995 Mihaylov ........... C22B 23/0415
423/139
2007/0248514 A1* 10/2007 Cheng .................. C22B 3/404
423/139
(Continued)

FOREIGN PATENT DOCUMENTS

CN    103199320 A    7/2013
CN    103334009 A    10/2013
(Continued)

OTHER PUBLICATIONS

Nguyen V., et al.; "Selective Recovery of Cobalt, Nickel, and Lithium from Sulfate Leachate of Cathode Scrap of Li-ion Batteries Using Liquid-Liquid Extraction"; Met. Mater. Int.; vol. 20, pp. 357-365 (Year: 2014).*
(Continued)

*Primary Examiner* — Alexandra M Moore
*Assistant Examiner* — Austin Pollock
(74) *Attorney, Agent, or Firm* — Birch, Stewart, Kolasch & Birch, LLP

(57) ABSTRACT

A method for recovering at least cobalt of valuable metals, cobalt and nickel, from an acidic solution obtained by subjecting waste containing positive electrode materials for lithium ion secondary batteries to a wet process, the acidic solution comprising cobalt ions, nickel ions and impurities, the method including: a first extraction step for Co recovery, the first extraction step being for extracting cobalt ions by solvent extraction from the acidic solution and stripping the cobalt ions; and a second extraction step for Co recovery, the second extraction step being for extracting cobalt ions by solvent extraction from a stripped solution obtained in the
(Continued)

first extraction step for Co recovery and stripping the cobalt ions, wherein the first extraction step for Co recovery includes: a solvent extraction process for extracting cobalt ions in the acidic solution into a solvent; a scrubbing process for scrubbing the solvent that has extracted the cobalt ions; and a stripping process for stripping the cobalt ions in the solvent after the scrubbing into a solution.

9 Claims, 3 Drawing Sheets

(51) Int. Cl.
    *C22B 26/12*     (2006.01)
    *H01M 10/54*     (2006.01)

(52) U.S. Cl.
    CPC ............ *H01M 10/54* (2013.01); *C22B 26/12* (2013.01); *Y02W 30/84* (2015.05)

(56) References Cited

U.S. PATENT DOCUMENTS

| | | | |
|---|---|---|---|
| 2008/0003154 A1* | 1/2008 | O'Callaghan | C22B 3/3842 423/139 |
| 2011/0135547 A1 | 6/2011 | Kobayashi et al. | |
| 2014/0294703 A1* | 10/2014 | Ozaki | H01M 4/525 423/139 |
| 2014/0348731 A1* | 11/2014 | Nakai | C22B 23/04 423/139 |
| 2015/0152522 A1* | 6/2015 | Jones | C22B 3/20 423/139 |
| 2019/0106768 A1* | 4/2019 | Ito | C22B 3/3846 |
| 2020/0044295 A1 | 2/2020 | Arakawa et al. | |
| 2022/0017989 A1* | 1/2022 | Beer | C22B 26/12 |
| 2022/0320619 A1* | 10/2022 | Hanisch | C22B 47/0063 |

FOREIGN PATENT DOCUMENTS

| | | | | |
|---|---|---|---|---|
| CN | 103773961 A | | 5/2014 | |
| CN | 105483382 A | | 4/2016 | |
| CN | 106684489 A | * | 5/2017 | ............... C22B 7/00 |
| JP | 2009-193778 A | | 8/2009 | |
| JP | 2010-180439 A | | 8/2010 | |
| JP | 2013-7107 A | | 1/2013 | |
| JP | 2014162982 A | * | 9/2014 | |
| JP | 5706457 B2 | | 4/2015 | |
| JP | 2015-183292 A | | 10/2015 | |
| KR | 101191042 B1 | * | 10/2012 | |
| WO | WO-2016052568 A1 | * | 4/2016 | ............ C22B 23/00 |
| WO | WO 2018/181816 A1 | | 10/2018 | |

OTHER PUBLICATIONS

Mohapatra D., et al.; "Liquid-Liquid extraction of aluminium(III) from mixed sulphate solutions using sodium salts of Cyanex 272 and D2EHPA", Separation and Purification Technology, vol. 56, p. 311-318 (Year: 2007).*
Jingu, et al.; "Recovery of cobalt sulfate from spent lithium ion batteries by reductive leaching and solvent extraction with Cyanex 272"; J. of Hydrometallurgy, 100, p. 168-171 (Year: 2010).*
Swain B., et al.; "Hydrometallurgical process for recovery of cobalt from waste cathodic active material generated during manufacturing of lithium ion batteries";, J. of Power Sources, 167, 2007,536-544 (Year: 2007).*
International Preliminary Report on Patentability and English translation of the Written Opinion of the International Searching Authority (Forms PCT/IB/338, PCT/IB/373, and PCT/ISA/237) for International Application No. PCT/JP2019/050411, dated Jul. 8, 2021.
International Search Report for PCT/JP2019/050411 (PCT/ISA/210) mailed on Mar. 10, 2020.
Xie, "Continuous Extraction and Separation of In (III) Bi (III) Zn (II) Fe (III) Cu (II) and Cd (II) in Sulfuric Acid Solution by P204," Tongling Nonferrous Metals Design and Research Institute, Dec. 31, 1985, 9 pages total, with partial English translation.
El-Nadi, "Solvent Extraction and Its Applications on Ore Processing and Recovery of Metals: Classical Approach," Separation & Purification Reviews, vol. 46, 2017, pp. 195-215.
Extended European Search Report for corresponding European Application No. 19902631.1, dated Sep. 12, 2022.
Lupi et al., "Studies concerning nickel electrowinning from acidic and alkaline electrolytes," Minerals Engineering, vol. 19, 2006 (Available online Jun. 8, 2006), pp. 1246-1250.

* cited by examiner

METHOD FOR RECOVERING VALUABLE METAL

FIELD OF THE INVENTION

The disclosure relates to a method for recovering a valuable metal such as cobalt and nickel from an acidic solution which is obtained by subjecting waste containing positive electrode materials for lithium ion secondary batteries to a wet process, and which contains cobalt ions, nickel ions and impurities.

BACKGROUND OF THE INVENTION

In recent years, it has been widely studied for recovery of valuable metals such as cobalt and nickel from waste containing positive electrode materials for lithium ion batteries discarded for expired product life, manufacturing defects or other reasons by means of a wet process or the like, in terms of effective utilization of resources.

For example, in order to recover valuable metals from waste containing positive electrode materials for lithium ion batteries, battery powder and the like obtained through a roasting step and other steps is added to an acid to be leached, resulting in an acidic solution in which lithium, nickel, cobalt, manganese, iron, copper, aluminum and the like are dissolved.

Subsequently, iron, copper, aluminum and the like are sequentially or simultaneously removed from various metal elements dissolved in the acidic solution by solvent extraction or neutralization at a plurality of stages, and valuable metals such as nickel, cobalt, manganese and lithium are separated and concentrated by solvent extraction to obtain a solution in which each metal is dissolved. Nickel and cobalt are recovered from each solution by electrolysis or the like (see, for example, Patent Literatures 1 to 3).

CITATION LIST

Patent Literatures

[Patent Literature 1] Japanese Patent Application Publication No. 2010-180439 A
[Patent Literature 2] U.S. Patent Application Publication No. 2011/0135547 A1
[Patent Literature 3] Japanese Patent No. 5706457 B

SUMMARY OF THE INVENTION

Technical Problem

It would be desirable in terms of aiming at recycling society for efficiently reusing limited resources, because, if high-purity cobalt and nickel can be recovered in the form of a compound with a predetermined inorganic acid such as sulfate from the waste containing the positive electrode materials for the lithium ion secondary batteries in the recovery process as described above, those compounds can be used in the production of lithium-ion secondary batteries.

Here, the acidic solution obtained by dissolving the battery powder or the like in an acid and then performing a predetermined neutralization or solvent extraction may contain impurities such as sodium, aluminum, manganese and the like. Such impurities reduce the purity of the finally obtained compound of cobalt or nickel with the inorganic acid. Therefore, they are required to be removed as much as possible upon recovery of cobalt or nickel.

The disclosure proposes a method for recovering a valuable metal, which can effectively remove certain impurities.

Solution to Problem

A method for recovering a valuable metal disclosed herein is a method for recovering at least cobalt of valuable metals, cobalt and nickel, from an acidic solution obtained by subjecting waste containing positive electrode materials for lithium ion secondary batteries to a wet process, the acidic solution comprising cobalt ions, nickel ions and impurities, the method comprising: a first extraction step for Co recovery, the first extraction step being for extracting cobalt ions by solvent extraction from the acidic solution and stripping the cobalt ions; and a second extraction step for Co recovery, the second extraction step being for extracting cobalt ions by solvent extraction from a stripped solution obtained in the first extraction step for Co recovery and stripping the cobalt ions, wherein the first extraction step for Co recovery comprises: a solvent extraction process for extracting cobalt ions in the acidic solution into a solvent; a scrubbing process for scrubbing the solvent that has extracted the cobalt ions; and a stripping process for stripping the cobalt ions in the solvent after the scrubbing into a solution.

Advantageous Effects of Invention

According to the above method for recovering a valuable metal, certain impurities can be effectively removed by the first extraction step for Co recovery, which includes the scrubbing process for scrubbing the solvent that has extracted the cobalt ions.

DETAILED DESCRIPTION OF THE INVENTION

Hereinafter, embodiments of the invention disclosed herein will be described in detail.

Figure 1:
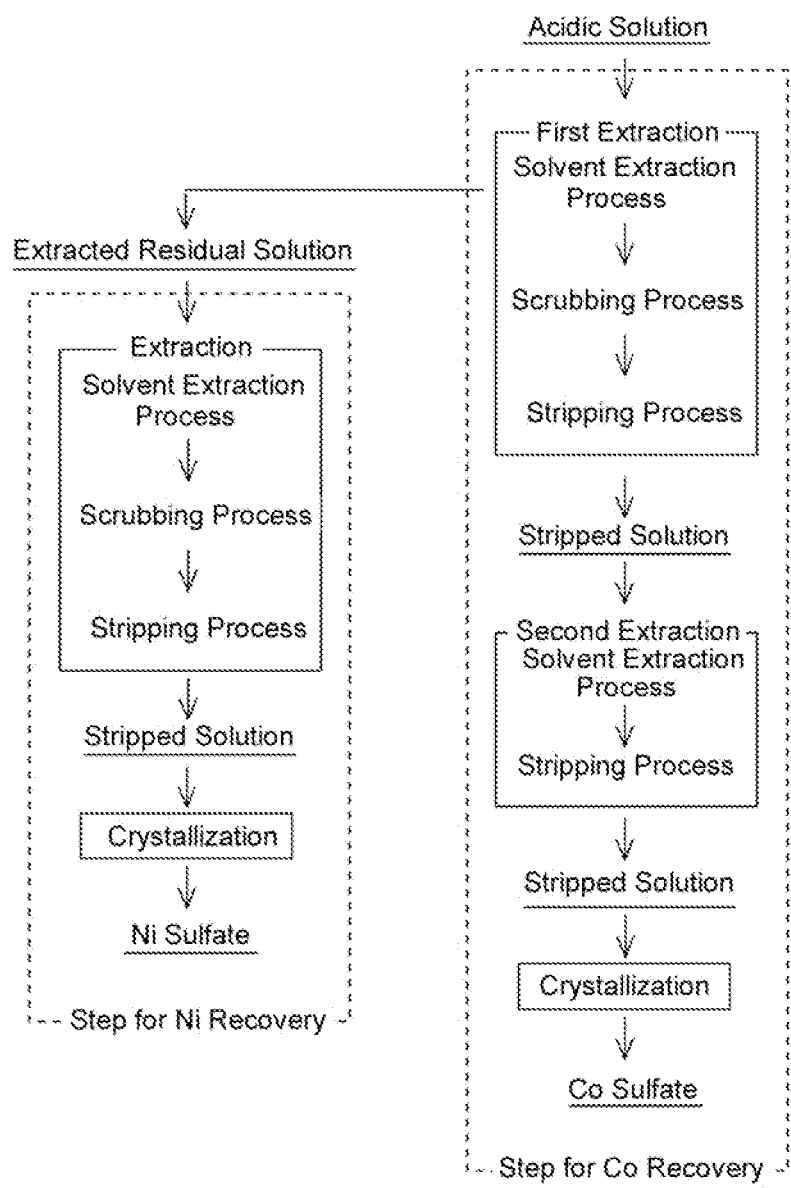
FIG. 1 is a flow chart showing a method for recovering a valuable metal according to an embodiment.

A method for recovering a valuable metal according to an embodiment includes carrying out each step as illustrated in FIG. 1 on an acidic solution which is obtained by subjecting waste containing positive electrode materials for lithium ion secondary batteries to a wet process, and which contains cobalt ions, nickel ions and impurities, and recovering at least cobalt of valuable metals, cobalt and nickel, from the acidic solution. More particularly, this embodiment includes: a first extraction step for Co recovery, the first extraction step being for extracting cobalt ions by solvent extraction from the acidic solution and stripping the cobalt ions; and a second extraction step for Co recovery, the second extraction step being for extracting cobalt ions by solvent extraction from a stripped solution obtained in the first extraction step for Co recovery and stripping the cobalt ions, wherein the first extraction step for Co recovery comprises: a solvent extraction process for extracting cobalt ions in the acidic solution into a solvent; a scrubbing process for scrubbing the solvent that has extracted the cobalt ions;

and a stripping process for stripping the cobalt ions in the solvent after the scrubbing into a solution.

<Acidic Solution>

Figure 2:
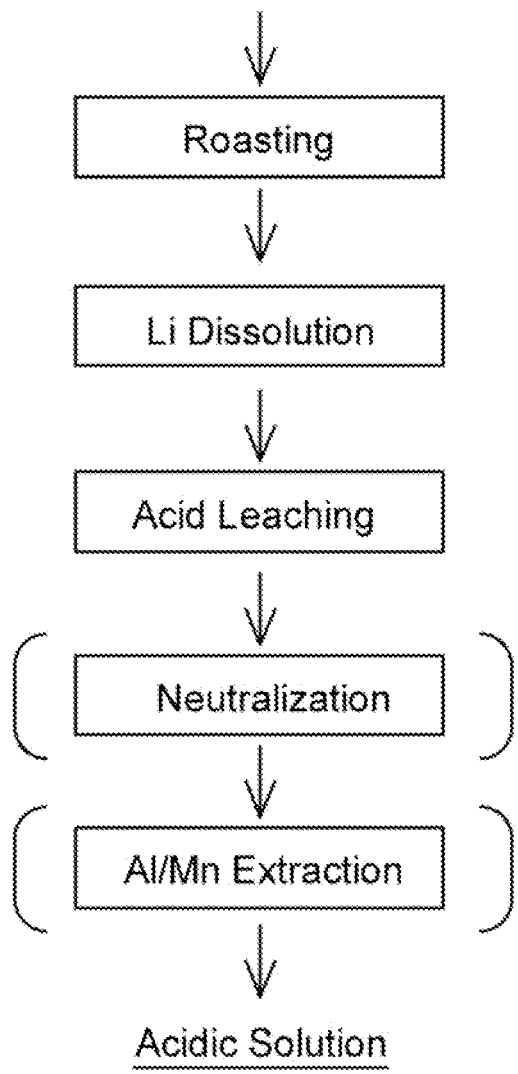
FIG. 2 is a flow chart showing an example of steps for obtaining an acidic solution of FIG. 1.

To obtain an acidic solution, for example, as shown in FIG. 2, a roasting step of roasting waste containing positive electrode materials for lithium ion secondary batteries can be carried out, followed by an optional sieving step, a lithium dissolution step of dissolving lithium using water or the like under a sieve, and an acid leaching step of leaching a residue of the lithium dissolution step with an acid. The resulting leached solution can be an acid leaching solution. In some cases, after the acid leaching step, only the neutralization step or only the Al/Mn extraction step or both the neutralization step and the Al/Mn extraction step can be carried out on the leached solution in this order, and the neutralized solution or the extracted solution can be used as the acidic solution. The respective steps will be described in detail below. It should be noted that the acidic solution is not limited to that described herein as long as it is obtained by subjecting the waste containing the positive electrode materials for lithium ion secondary batteries to any wet process.

(Waste Containing Positive Electrode Material for Lithium Ion Secondary Batteries)

The waste of interest, which contains positive electrode materials for lithium ion secondary batteries (hereinafter, referred to as simply "battery waste") includes positive electrode materials which have been discarded due to the expired life of the product, manufacturing defects or other reasons, for lithium ion secondary batteries which can be used in various electronic devices such as mobile phones. The recovery of valuable metals from such battery waste is preferred in terms of effective utilization of resources. Further, an object herein is to recover valuable metals cobalt and nickel with high purity so that they can be reused for manufacturing lithium ion secondary batteries.

Here, this embodiment targets battery waste containing at least cobalt and nickel. In particular, the battery waste typically contains 30% by mass or less of cobalt and 30% by mass or less of nickel. The battery waste may contain, for example, from 0.1% by mass to 40.0% by mass of cobalt and from 0.1% by mass to 15.0% by mass of nickel.

The lithium ion secondary battery has a housing containing aluminum as an exterior that wraps around the lithium ion secondary battery. Examples of the housing include those made only of aluminum and those containing aluminum, iron, aluminum laminate, and the like. The lithium ion secondary battery may also contain, in the above housing, positive electrode active materials composed of one single metal oxide or two or more composite metal oxides or the like, selected from the group consisting of lithium, nickel, cobalt and manganese, and aluminum foils (positive electrode substrates) to which the positive electrode active materials are applied and fixed by, for example, polyvinylidene fluoride (PVDF) or other organic binder. In addition, the lithium ion battery may contain copper, iron, or the like. Further, the lithium ion secondary battery generally contains an electrolytic solution in the housing. For example, ethylene carbonate, diethyl carbonate or the like may be used as the electrolytic solution.

The battery waste may be in the form of being wrapped by the housing, or may be in the form of powder that has already been subjected to any processing such as crushing, decomposition or separation. Such powdered battery waste may present black color. On the other hand, when the battery waste in the form of being wrapped by the housing is targeted, a crushing step for removing the positive electrode materials and negative electrode materials from the housing can be performed after the roasting step.

(Roasting Step)

In the roasting step, the above battery waste is heated. The roasting step is carried out for the purposes of changing a metal such as lithium and cobalt contained in the battery waste to a form of the metal which can be easily dissolved, and the like, for example.

In the roasting step, the battery waste is preferably heated by maintaining it in a temperature range of from 450° C. to 1000° C., preferably in a temperature range of from 600° C. to 800° C., for 0.5 to 4 hours, for example. The roasting step can be carried out by using various heating equipment such as a rotary kiln furnace or other various furnaces, and a furnace for heating in an air atmosphere.

(Lithium Dissolution Step)

In the lithium dissolution step, the battery waste that has undergone the roasting step is brought into contact with water to dissolve the lithium contained therein in water. This can allow lithium contained in the battery waste to be separated at an early phase of the recovery process. The water used herein can be tap water, industrial water, distilled water, purified water, ion-exchanged water, pure water, ultrapure water and the like.

(Acid Leaching Step)

In the acid leaching step, the residue obtained in the above lithium dissolution step is added to an acidic solution such as sulfuric acid and leached therein. The acid leaching step can be carried out by a known method or conditions. It is preferable that a pH of the acidic solution is from 0 to 2.0, and an oxidation-reduction potential (ORP value, silver/silver chloride potential reference) of the acidic solution is 0 mV or less.

(Neutralization Step)

A leached solution obtained in the acid leaching step can be subjected to a neutralization step of adding an alkali such as sodium hydroxide, sodium carbonate, and ammonia to the leached solution to increase a pH of the leached solution, whereby aluminum in the leached solution can be precipitated and removed. However, the neutralization step may be omitted.

In the neutralization step, the pH is preferably from 4.0 to 6.0, the ORP value (ORPvsAg/AgCl) is preferably from −500 mV to 100 mV, and the solution temperature is preferably from 50° C. to 90° C.

The neutralization step is generally carried out under a condition where a part of Al contained in the leached solution is removed, in order to suppress a loss of cobalt or nickel due to coprecipitation. Thus, the residue of the Al will remain in a dissolved state in the neutralized solution. The residue of Al can be removed in the next extraction step. An Al concentration after the neutralization step is generally from 0.1 g/L to 1.0 g/L, typically from 0.3 g/L to 0.8 g/L.

(Al/Mn Extraction Step)

After the acid leaching step or the neutralization step when the neutralization step is carried out, an Al/Mn extraction step is carried out to extract the residue of aluminum and manganese from the leached solution or the neutralized solution. In this case, the residue of aluminum and manganese are extracted to obtain an extracted residual solution (an aqueous phase) from which they have been removed. The Al/Mn extraction step may be omitted. It should be noted that, in this embodiment, when relatively large amounts of aluminum ions and/or manganese ions are contained, it is desirable to perform an Al/Mn extraction step to remove them sufficiently, because it is difficult to remove aluminum and manganese in a scrubbing process or the like as described later.

In the Al/Mn extraction step, it is preferable to use a mixed extracting agent containing a phosphate ester-based extracting agent and an oxime-based extracting agent for the leached solution or the neutralized solution. Here, examples of the phosphate ester-based extracting agent include di-2-ethylhexylphosphoric acid (trade name: D2EHPA or DP8R). The oxime-based extracting agent is preferably aldoxime or based on aldoxime. Specific examples include 2-hydroxy-5-nonylacetophenone oxime (trade name: LIX 84), 5-dodecylsalicylaldoxime (trade name: LIX 860), a mixture of LIX 84 and LIX 860 (trade name: LIX984), 5-nonylsalicylaldoxime (trade name: ACORGAM 5640) and the like, among which 5-nonylsalicylaldoxime is preferable in terms of price and the like.

In the solvent extraction, the pH is preferably from 2.3 to 3.5, and more preferably from 2.5 to 3.0.

The leached solution obtained in the acid leaching step, the neutralized solution obtained in the neutralization step or the extracted residual solution obtained in the Al/Mn extraction step as described above can be the acidic solution targeted in steps for Co recovery as described later.

Such an acidic solution may contain cobalt ions, for example in an amount of from 0 g/L to 15 g/L, typically from 5 g/L to 10 g/L, and nickel ions, for example in an amount of from 0 g/L to 50 g/L, typically from 5 g/L to 30 g/L.

Further, the acidic solution may contain at least one selected from the group consisting of sodium ions, aluminum ions, manganese ions, and lithium ions as impurities. Among them, the sodium ions are impurities that may be contaminated in various steps such as the neutralization step, so that it is important to effectively remove them in the steps as described later. When containing the sodium ions, the sodium concentration may be, for example, from 0 g/L to 30 g/L, typically from 10 g/L to 20 g/L. When containing the aluminum ions, the aluminum concentration may be, for example, from 0.000 g/L to 0.050 g/L, typically from 0.010 g/L to 0.020 g/L. When containing the manganese ions, the manganese concentration may be, for example, from 0.000 g/L to 0.100 g/L, typically from 0.010 g/L to 0.050 g/L. Since aluminum and manganese may not be removed by the steps as described below, it is desirable that the total concentration of aluminum and manganese is sufficiently decreased, such as, for example, about 1 mg/L or less. When containing the lithium ions, the lithium concentration may be, for example, from 0.000 g/L to 2 g/L, typically from 0.100 g/L to 1.5 g/L. In addition, the acidic solution may contain iron ions and/or copper ions. The iron concentration may preferably be 10 mg/L or less, more preferably 0.005 g/L or less, and the copper concentration may preferably be 10 mg/L or less, more preferably 0.005 g/L or less.

(Step for Co Recovery)
(First Extraction Step)

The first extraction step is carried out to recover cobalt or both of cobalt and nickel from the acidic solution as described above. This first extraction step is also referred to as a first extraction step for Co recovery, because it mainly extracts the cobalt ions in the acidic solution by solvent extraction and strip them.

More particularly, first, the first extraction step carries out a solvent extraction process for extracting the cobalt ions from the acidic solution into an extracting agent (an organic phase) as a solvent using a phosphonate ester-based extracting agent. As the phosphonate ester-based extracting agent, 2-ethylhexyl 2-ethylhexylphosphonate (trade name: PC-88A, Ionquest 801) is preferable in terms of separation efficiency of nickel and cobalt. A pH at the time of extraction is preferably from 5.0 to 6.0, and more preferably from 5.2 to 5.7.

A scrubbing process is then performed to scrub the solvent that has extracted the cobalt ions. The scrubbing process is intended to remove sodium ions that may be extracted together with the cobalt ions into the solvent, rather than to wash away an acidic solution that may be contained in the solvent. This is based on a new finding that when the sodium ions are contained in the acidic solution, the sodium ions extracted therein can be effectively removed by scrubbing the solvent after solvent extraction.

In order to remove the sodium ions in the solvent more effectively, a pH of a scrubbing solution used in the scrubbing process is preferably from 4 to 5. If the pH of the scrubbing solution is less than 4, cobalt in the solvent may be lost, while if the pH is more than 5, sodium may not be sufficiently removed. From this point of view, the pH of the scrubbing solution is even more preferably from 4.3 to 4.6. The scrubbing solution can be, for example, a sulfuric acid acidic solution.

The number of scrubbing processes of the solvent and the O/A ratio in the scrubbing process can be appropriately determined depending on the composition of the solution and other conditions. The number of scrubbing processes may be one or more and the O/A ratio is preferably from 0.5 to 1.5.

By undergoing such a scrubbing process, the sodium concentration in the solvent can be reduced to 5 mg/L or less, and preferably 1 mg/L or less.

Since the scrubbing solution after being used for the scrubbing may contain cobalt ions, it can be mixed with an acidic solution intended to extract the cobalt ions in the first extraction step for Co recovery in order to reduce cobalt loss.

Subsequently, the extracting agent containing the cobalt ions, which has undergone the scrubbing process, can be subjected to a stripping process. The solution used for the stripping process may be any of inorganic acids such as sulfuric acid, hydrochloric acid and nitric acid, but sulfuric acid is generally preferable. Here, the stripping is carried out under such a pH condition that all of possible cobalt ions are extracted from the organic phase into the solution (aqueous phase). Specifically, the pH is preferably in a range of from 2 to 4, and even more preferably in a range of from 2.5 to 3.5. It should be noted that the O/A ratio and the number of stripping processes can be appropriately determined. The temperature of the solution may be room temperature, but it is preferably from 0° C. to 40° C.

(Second Extraction Step)

In order to selectively extract the cobalt ions from the stripped solution obtained in the first extraction step for Co recovery as described above to separate the cobalt ions from the nickel ions, a second extraction step (second extraction step for Co recovery) by solvent extraction is performed. In the steps for Co recovery, the nickel ions can be treated as impurities.

Here, in order to selectively extract the cobalt ions, it is preferable to use a masking agent for masking the nickel ions and leaving them in the aqueous phase at the time of extraction. As the masking agent, ammonia ions are particularly effective because they do not mask the cobalt ions but mask the nickel ions. The ammonia ions also function as a pH adjusting agent during extraction.

Specifically, before or after bringing the stripped solution obtained in the first extraction step into contact with the extracting agent in the second extraction step, the ammonia ions can be added to the stripped solution to adjust the pH to extract the cobalt ions. The ammonia ions can be added in the form of, for example, aqueous ammonia or ammonium chloride ($NH_4Cl$). When the aqueous ammonia is added, an amount of aqueous ammonia added is preferably from 1% to 10% in volume ratio with respect to the cobalt solution.

The extracting agent to be brought into contact with the stripped solution obtained in the first extraction step may be a phosphonic acid-based extracting agent or a phosphoric acid-based extracting agent, but it is preferably a phosphinic acid-based extracting agent, and among them, it further preferably contains bis(2,4,4-trimethylpentyl)phosphinic acid. More particularly, ALBRITECT TH1 (trade name) or Cyanex 272 from SOLVAY are particularly preferable, although the present invention is not limited thereto. This can lead to an extraction curve of cobalt and nickel, which sufficiently separates them between a lower pH side and a higher pH side as compared with the extracting agent such as 2-ethylhexyl 2-ethylhexylphosphonate (PC-88A, lonquest 801), whereby a range where the cobalt ions are extracted but the nickel ions are not extracted will be expanded. That is, this can achieve an easier selective extraction of only cobalt ions. When the extracting agent contains bis(2,4,4-trimethylpentyl)phosphinic acid, its purity can be, for example, 95% or higher.

The extracting agent can employ a hydrocarbon-based organic solvent such as an aromatic-based, paraffin-based, or naphthenic-based solvent, which can be diluted to have a concentration of from 10 to 30% by volume.

As an example of the extraction procedure, the stripped solution (aqueous phase) obtained in the first extraction step and the above extracting agent (organic phase) are brought into contact with each other while adding aqueous ammonia or the like, and they are mixed with a mixer with stirring, for example, at 200 to 500 rpm for 5 to 60 minutes to allow the cobalt ions to react with the extracting agent. The solution temperature at this time is from 15° C. to 60° C. The combined organic phase and aqueous phase are then separated by a difference in specific gravity.

The solvent extraction may be repeated, and use, for example, a multi-stage method in which the organic phase and the aqueous phase are in countercurrent contact with each other. The O/A ratio (volume ratio of the organic phase to the aqueous phase) is generally from 0.1 to 10.

An equilibrium pH during extraction is preferably from 4 to 7, and more preferably from 5 to 6. This can allow the nickel ions to be left in the aqueous phase and cobalt ions to be effectively extracted into the organic phase. However, the appropriate pH range may be outside the above range, because it may change depending on combinations of the cobalt concentration, the volume fraction of the extracting agent, the phase ratio of oil and water, the temperature, and the like.

After the extraction, stripping is performed on the organic phase containing the cobalt ions. The stripping can be carried out by using a stripping solution such as an acidic aqueous solution of sulfuric acid or hydrochloric acid and mixing them with a mixer or the like with stirring at 200 to 500 rpm for 5 to 60 minutes.

As the stripping solution, sulfuric acid is preferably used in view of the next step, i.e., a crystallization step of cobalt sulfate. An acid concentration of the stripping solution is preferably adjusted to a pH of from 1.0 to 3.0, and more preferably a pH of from 1.5 to 2.5.

The stripping can be carried out at 15° C. to 60° C. or lower.

The stripping can allow the cobalt ions to move from the organic phase to the aqueous phase side to obtain a stripped solution (aqueous phase) containing cobalt ions. Here, since a large amount of nickel ions have left in the aqueous phase during extraction as described above, the stripped solution contains substantially no nickel ions.

The cobalt concentration in the stripped solution is, for example, from 1 g/L to 200 g/L, typically from 80 g/L to 100 g/L. The nickel concentration in the stripped solution can be, for example, 2 mg/L or less, typically 1 mg/L or less.

(Crystallization Step)

The stripped solution obtained in the second extraction step is subjected to a crystallization step for Co recovery, which crystallizes the cobalt ions contained therein. Here, the stripped solution is heated to, for example, 40° C. to 120° C. to concentrate them, and the cobalt ions are crystallized as cobalt sulfate.

Impurities other than cobalt ions have been sufficiently removed from the stripped solution obtained in the second extraction step through the above steps. Therefore, in this embodiment, it is possible to omit a washing step for removing the impurities after the second extraction step and before the crystallization step. Therefore, in this embodiment, the crystallization step can be performed on the stripped solution obtained in the second extraction step without undergoing the washing step.

The cobalt sulfate thus produced has a nickel content of preferably 5 ppm by mass or less, and nickel is sufficiently removed, so that the cobalt sulfate can be effectively used as a raw material for the production of lithium ion secondary batteries and other batteries.

(Step for Ni Recovery)
(Extraction Step)

In the step for Co recovery, first, as a solvent extraction process, the nickel ions are separated from the extracted residual solution obtained in the first extraction step for Co Recovery as described above using a carboxylic acid-based extracting agent to extract the nickel ions into the solvent. Examples of the carboxylic acid-based extracting agent include neodecanoic acid and naphthenic acid. Among them, neodecanoic acid is preferable in terms of an extraction ability of the nickel ions.

In the solvent extraction process, the pH is preferably from 6.0 to 8.0, and more preferably from 6.8 to 7.2.

Then, a scrubbing process for scrubbing the solvent that has extracted the nickel ions is performed for the purpose of removing the sodium ions that can be extracted into the solvent.

A pH of a scrubbing solution used in the scrubbing process is preferably from 4 to 5. This can allow the sodium ions to be more efficiently removed without leaving a large amount of nickel ions in the solvent in the scrubbing solution. If the pH of the scrubbing solution is less than 4, nickel in the solvent may be lost, while if the pH is more than 5, sodium may not be sufficiently removed. From this point of view, the pH of the scrubbing solution is even more preferably from 4.3 to 4.6. The scrubbing solution can be, for example, a sulfuric acid acidic solution.

The number of scrubbing processes of the solvent and the O/A ratio in the scrubbing process can be appropriately determined depending on the composition of the solution and other conditions. The number of scrubbing processes may be one or more and the O/A ratio is preferably from 0.5 to 1.5.

By undergoing such a scrubbing process, the sodium concentration in the solvent can be reduced to 5 mg/L or less, and preferably 1 mg/L or less.

The scrubbing solution after being used for the scrubbing may contain nickel ions. When the scrubbing solution after the scrubbing is mixed with an acidic solution before extracting the nickel ions in the extraction step for Ni recovery, a loss of such nickel ions can be reduced.

After the scrubbing, the organic phase containing the nickel ions is subjected to a stripping process using a stripping solution such as sulfuric acid, hydrochloric acid or nitric acid. For general purposes, sulfuric acid is desirable. Here, the stripping is carried out under such a pH condition that 100% of nickel ions are extracted from the organic phase into an acidic solution (aqueous phase). Specifically, the pH is preferably in the range of from 1.0 to 3.0, and more preferably from 1.5 to 2.5. The O/A ratio and the number of stripping processes can be appropriately determined, but the O/A ratio is preferably from 5 to 1, and more preferably from 4 to 2. By increasing the number of stripping processes, the concentration of the target metal can be increased to a concentration that is advantageous for the electrolysis step.
(Crystallization Step)

In the crystallization step for Ni recovery, the stripped solution obtained in the extraction step for Ni recovery is heated to, for example, 40° C. to 120° C. to concentrate it, and the nickel ions are crystallized as nickel sulfate.

The cobalt sulfate obtained in the crystallization step contains substantially no impurities and is suitable for use as a raw material for manufacturing lithium ion secondary batteries.

Examples

The method as described above was experimentally conducted and its effects were confirmed as described below. However, the description herein is merely for the purpose of illustration and is not intended to be limited thereto.

Figure 3:
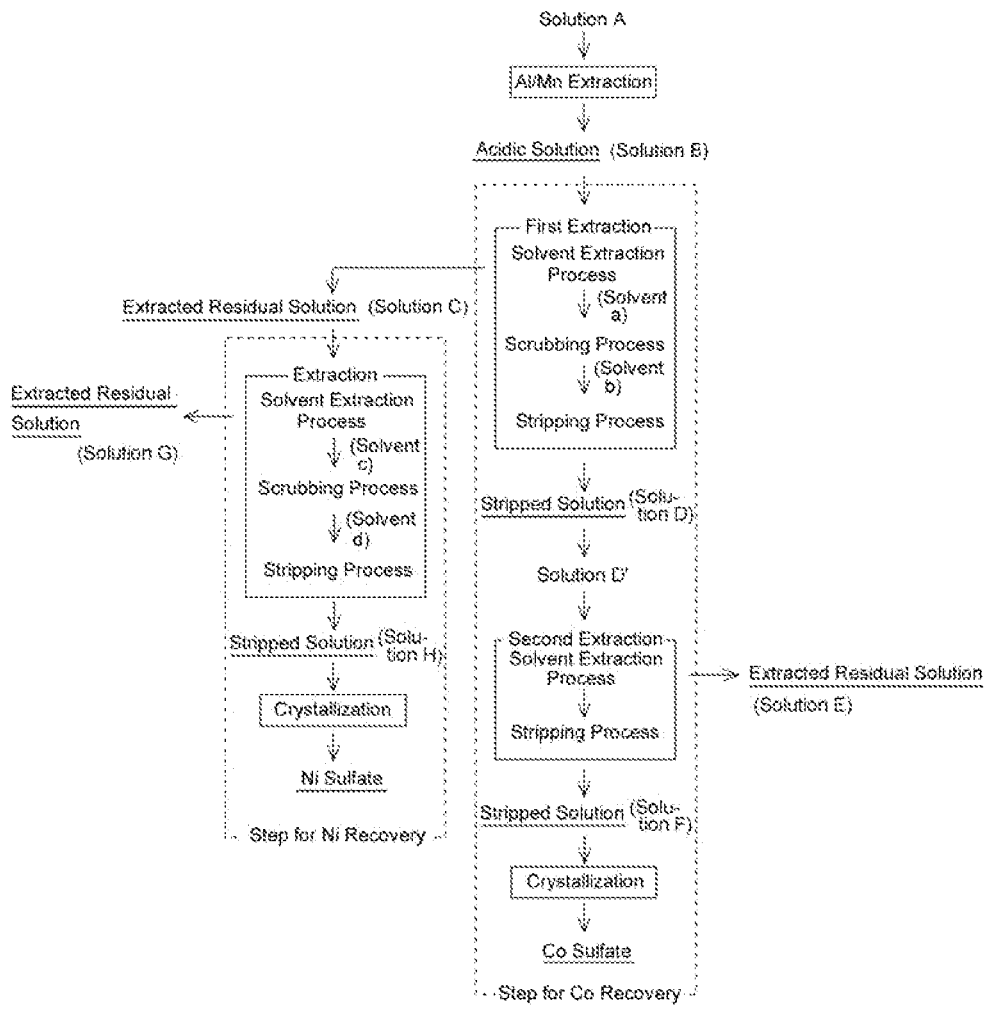
FIG. 3 is a flow chart showing a method according to Example.

The acidic solution was subjected to each step shown in FIG. 3 to obtain cobalt sulfate and nickel sulfate. Details are as follows:
(Acidic Solution)

As described above, black powdery waste containing positive electrode materials for lithium ion secondary batteries was subjected to the steps of roasting, lithium dissolution, acid leaching, neutralization, and Al/Mn extraction in this order to obtain an acidic solution containing cobalt ions and nickel ions (Solution B). Table 1 shows concentrations of various metals in the solution before and after the extraction of Al and Mn by which the acidic solution (Solution B) was obtained. In Table 1, Solution A is a solution before the Al/Mn extraction step is performed.

TABLE 1

|  | Co | Ni | Al | Fe | Cu | Li | Mn | Na |
|---|---|---|---|---|---|---|---|---|
| Before (Solution A) [mg/L] | 15,000 | 43,000 | 103 | 52 | <10 | 1,500 | 15,000 | 8,500 |
| After (Solution B) [mg/L] | 11,000 | 35,000 | 14 | <10 | <10 | 1,000 | 0.28 | 24,000 |

(Step for Co Recovery)

The above acidic solution (Solution B) was subjected to the first extraction step. For the conditions of the solvent extraction process in the first extraction step, 2-ethylhexyl 2-ethylhexylphosphonate (trade name: PC-88A) was used, and the pH during extraction was 5.5. As a result, an extracting agent (Solvent a) that extracted cobalt ions was obtained. The concentrations of various metals in the extracted residual solution (Solution C) were as shown in Table 2.

TABLE 2

|  | Co | Ni | Al | Fe | Cu | Li | Mn | Na |
|---|---|---|---|---|---|---|---|---|
| Before (Solution B) [mg/L] | 11,000 | 35,000 | 14 | <10 | <10 | 1,000 | 0.25 | 24,000 |
| After (Solution C) [mg/L] | 0.01 | 30,000 | <1 | <1 | <1 | 770 | <1 | 35,000 |

The extracting agent (Solvent a) that extracted the cobalt ions was then subjected to the scrubbing process with a scrubbing solution to obtain Solvent b in which nickel ions and the like were reduced as shown in Table 3, and then subjected to the stripping process to obtain a stripped solution (Solution D) having the concentrations as shown in Table 4. The scrubbing was performed under the condition of pH 4.5, and the stripping was performed under the condition of pH 2.0.

TABLE 3

|  | Co | Ni | Al | Fe | Cu | Li | Mn | Na | Vol [L] |
|---|---|---|---|---|---|---|---|---|---|
| Before (Solvent a) [mg/L] | 10,000 | 5,000 | <1 | <1 | <1 | 50 | 0.25 | 500 | 60 |
| After (Solvent b) [mg/L] | 10,000 | 44 | <1 | <1 | <1 | <1 | 0.25 | 1 | 60 |

TABLE 4

|  | Co | Ni | Al | Fe | Cu | Li | Mn | Na | Vol [L] |
|---|---|---|---|---|---|---|---|---|---|
| After (Solution D) [mg/L] | 125,000 | 625 | <1 | <1 | <1 | <1 | 3 | 9 | 6.45 |

The stripped solution (Solution D) as described above was diluted, and the resulting solution D' was subjected to the second extraction step. For the conditions of the extraction in the second extraction step, ALBRETECT TH1 was used, the pH during the extraction was 5.5, and for the condition of the stripping, the pH was 2.0. The metal concentrations before and after the extraction in the second extraction step and the metal concentrations in the stripped solution (Solution F) are shown in Tables 5 and 6, respectively. The Solution E in Table 5 is the extracted residual solution in the second extraction step. Here, the Solution D' obtained by diluting the Solution D was subjected to the second extraction step. Such dilution can be appropriately carried out in view of viscosity and phase separation of the solution. The dilution may not be carried out.

TABLE 5

|  | Co | Ni | Al | Fe | Cu | Li | Mn | Na | Vol [L] |
|---|---|---|---|---|---|---|---|---|---|
| Before (Solution D') [mg/L] | 20,000 | 100 | <1 | 12 | <1 | <1 | 1 | 100 | 4.65 |
| After (Solution E) [mg/L] | 200 | 100 | <1 | <1 | <1 | <1 | 0 | 100 | 4.65 |

TABLE 6

|  | Co | Ni | Al | Fe | Cu | Li | Mn | Na | Vol [L] |
|---|---|---|---|---|---|---|---|---|---|
| After (Solution F) [mg/L] | 120,000 | 3 | <1 | <1 | <1 | <1 | 3 | 4 | 0.86 |

The stripped solution (Solution F) in the second extraction step was subjected to the crystallization step under the condition of 80° C. to obtain cobalt sulfate. A metal quality of cobalt sulfate was as shown in Table 7. As can be seen from the results shown in Table 7, the cobalt sulfate had sufficiently reduced impurities such as nickel and sodium, and had high cobalt purity.

TABLE 7

|  | Co | Ni | Al | Fe | Cu | Li | Mn | Na |
|---|---|---|---|---|---|---|---|---|
| [ppm] | 20.4% | <1 | <1 | <1 | <1 | <1 | <1 | <1 |

(Step for Ni Recovery)

Using the extracted residual solution (Solution C) obtained in the first extraction step in the step for Co recovery, the extraction step for extracting and stripping the nickel ions was carried out. The conditions of the extraction process at this time were a pH of 7 using neodecanoic acid, the condition of the scrubbing process was a pH of 4.5, and the condition of the stripping process was a pH of 2. Table 8 shows various metal concentrations in the solution before and after the solvent extraction process, Table 9 shows various metal concentrations before and after the scrubbing process, and Table 10 shows various metal concentrations in the stripped solution (Solution H) obtained after the stripping process. It should be noted that the Solution G in Table 8 is the extracted residual solution in the extraction step, and the Solvents c and d in Table 9 are the solvents before and after the scrubbing, respectively.

TABLE 8

|  | Co | Ni | Al | Fe | Cu | Li | Mn | Na | Vol [L] |
|---|---|---|---|---|---|---|---|---|---|
| Before (Solution C) [mg/L] | <1 | 30,000 | <1 | <1 | <1 | 770 | <1 | 35,000 | 60 |
| After (Solution G) [mg/L] | <1 | 1,500 | <1 | <1 | <1 | 770 | <1 | 39,000 | 60 |

TABLE 9

|  | Co | Ni | Al | Fe | Cu | Li | Mn | Na | Vol [L] |
|---|---|---|---|---|---|---|---|---|---|
| Before (Solvent c) [mg/L] | <1 | 28,500 | <1 | <1 | <1 | <1 | <1 | 500 | 60 |
| After (Solvent d) [mg/L] | <1 | 28,500 | <1 | <1 | <1 | <1 | <1 | 1 | 60 |

TABLE 10

|  | Co | Ni | Al | Fe | Cu | Li | Mn | Na | Vol [L] |
|---|---|---|---|---|---|---|---|---|---|
| After (Solution H) [mg/L] | 0 | 117,000 | <1 | <1 | <1 | 6 | 3 | 5 | 12.2 |

The stripped solution (solution H) in the above extraction step was subjected to the crystallization step for concentrating it under the condition of 80° C. to form nickel sulfate. The metal quality of nickel sulfate was as shown in Table 11.

TABLE 11

|  | Co | Ni | Al | Fe | Cu | Li | Mn | Na |
|---|---|---|---|---|---|---|---|---|
| [ppm] | <1 | 21.9% | <1 | <1 | <1 | <1 | <1 | <1 |

The invention claimed is:

1. A method for recovering a valuable metal, the method recovering at least cobalt of valuable metals, cobalt and nickel, from an acidic solution obtained by subjecting waste containing positive electrode materials for lithium ion secondary batteries to a wet process, the acidic solution comprising cobalt ions, nickel ions and impurities, the method comprising:
   a first extraction step for Co recovery, the first extraction step being for extracting cobalt ions by solvent extraction from the acidic solution and stripping the cobalt ions; and a second extraction step for Co recovery, the second extraction step being for extracting cobalt ions by solvent extraction from a stripped solution obtained in the first extraction step for Co recovery and stripping the cobalt ions,
   wherein the first extraction step for Co recovery comprises: a solvent extraction process for extracting cobalt ions in the acidic solution into a solvent; a scrubbing process for scrubbing the solvent that has extracted the cobalt ions; and a stripping process for stripping the cobalt ions in the solvent after the scrubbing into a solution, and
   wherein a phosphonate ester-based extracting agent is used as a first extracting agent in the first extraction step, and an extracting agent different from the first extracting agent is used as a second extracting agent in the second extraction step.

2. The method for recovering a valuable metal according to claim 1, wherein a scrubbing solution used for scrubbing the solvent has a pH of from 4 to 5 in the scrubbing process of the first extraction step for Co Recovery.

3. The method for recovering a valuable metal according to claim 1,
   wherein the impurities contained in the acidic solution comprises sodium ions, and
   wherein the solvent has a sodium concentration of 5 mg/L or less in the scrubbing process of the first extraction step for Co Recovery.

4. The method for recovering a valuable metal according to claim 1, further comprising an extraction step for Ni recovery, the extraction step being for extracting nickel ions by solvent extraction from an extracted residual solution obtained in the first extraction step for Co recovery and stripping the nickel ions,
   wherein the extraction step for Ni recovery comprises: a solvent extraction process for extracting nickel ions in the acidic solution into a solvent; a scrubbing process for scrubbing the solvent that has extracted the nickel ions; and a stripping process for stripping nickel ions in the solvent after scrubbing into a solution.

5. The method for recovering a valuable metal according to claim 4, further comprising a crystallization step for Ni recovery, the crystallization step being for using a stripped solution obtained in the extraction step for Ni recovery to crystallize nickel ions contained in the stripped solution.

6. The method for recovering a valuable metal according to claim 4, wherein a scrubbing solution used for scrubbing the solvent has a pH of from 4 to 5 in the scrubbing process of the first extraction step for Ni Recovery.

7. The method for recovering a valuable metal according claim 4,
   wherein the impurities contained in the acidic solution comprises sodium ions, and
   wherein the solvent has a sodium concentration of 5 mg/L or less in the scrubbing process of the extraction step for Ni Recovery.

8. The method for recovering a valuable metal according to claim 1, wherein the impurities contained in the acidic solution comprise aluminum and/or manganese, and wherein a total concentration of aluminum and manganese in the acidic solution is 1 mg/L or less.

9. The method for recovering a valuable metal according to claim 1,
   wherein the impurities contained in the acidic solution comprise manganese, and
   wherein the method further comprises an Mn extraction step for extracting at least manganese ions by solvent extraction and stripping them to obtain the acidic solution.

* * * * *